United States Patent [19]
Du

[11] Patent Number: 5,311,102
[45] Date of Patent: May 10, 1994

[54] POWER SUPPLY UNIT FOR DISCHARGE LAMPS

[75] Inventor: Rong Jiu Du, Weihai, China

[73] Assignee: Wei Hai Bei Yang Electric Group Corp., Wanchai, Hong Kong

[21] Appl. No.: 881,937

[22] Filed: May 12, 1992

[30] Foreign Application Priority Data

Sep. 18, 1991 [CN] China .................................. 91108951

[51] Int. Cl.$^5$ ..................... H05B 41/29; H05B 41/36
[52] U.S. Cl. ................................. 315/205; 315/209 R; 315/224; 315/226; 315/307; 315/DIG. 2; 315/DIG. 5
[58] Field of Search ..................... 315/205, 209 R, 224, 315/226, 307, DIG. 5, DIG. 2

[56] References Cited

U.S. PATENT DOCUMENTS

| 4,808,887 | 2/1989 | Fähnrich et al. | 315/247 |
| 4,949,016 | 8/1990 | DeBijl et al. | 315/226 X |

FOREIGN PATENT DOCUMENTS

0075176A2  7/1982  Finland ....................... H05B 41/29

Primary Examiner—David Mis
Attorney, Agent, or Firm—Pennie & Edmonds

[57] ABSTRACT

The present invention relates to a power supply unit for discharge lamps, comprising a rectifier (3); an oscillator output portion (5); an inductor (1); capacitor (2, 4, 7, 8). And further comprising a sampling resistor (9) and a module (10). It is used to reduce the capacitive impedance at the input end of the circuit, minimizing the components of high-order harmonics produced in the circuit, weakening the high-order harmonics of source current to the degree that they no longer impact the power network.

3 Claims, 5 Drawing Sheets

POWER SUPPLY UNIT FOR DISCHARGE LAMPS

FIELD OF THE INVENTION

The invention relates to a power supply unit for discharging lamps. More particularly, it relates to a power supply unit which is able to convert 50 Hz/60 Hz ac power to 30–40 KHz or even higher frequency ac power, and which is used for starting fluorescent lamps.

BACKGROUND OF THE INVENTION

U.S. Pat. No. 4,808,887 publicizes a power supply unit for starting fluorescent lamps, which consists of HF filters, a rectification network, push-pull oscillation circuits, series-connected resonance circuits and two groups of parallel-connected diodes. By using HF filters, the unit is intended to eleminate the interference on the power transmission network caused by higher order harmonics produced by capacitors with large capacitance in the voltage regulating circuit in the rectifying network. However, the final results of this type of circuits are not satisfactory.

European Patent EP 0075176 publicizes another power supply unit for discharging lamps, which features almost identical HF filters, rectifying network and resonance circuit, and excitation of the fluorescent lamp by means of a bridge-circuit output, its aim being to avoid phase shift and increase the power factor.

Since in both the above-mentioned circuits capacitors with high capacitance values are used in the voltage regulating circuit of the rectifying network, it is necessary to add a number of HF filters at the input end of the rectifying network. In spite of this, high-order harmonics caused by large the capacitance cannot be completely eliminated. Therefore, the capacitance value of the voltage regulating circuit has to be reduced without affecting the operation of the circuit. The reducing of the capacitance value will result in a significant reduction of the components of high-order harmonics produced by the circuit. The object of the present invention is to reduce the capacitive impedance at the input end of the circuit, increase the matching of the inductive impedance and the capacitive impedance at the input end, thus minimizing the components of high-order harmonics produced by the circuit.

The object of the present invention is to reduce the capacitive impedance at the input end of the circuit, increase the matching of the inductive impedance and the capacitive impedance at the input end, thus minimizing the components of high-order harmonics produced in the circuit, improving the current waveform at the input end to the extent of being near a sinusoidal wave, increasing the power factor and weakening the high-order harmonics of source current to the degree that they no longer impact the power network.

Another object of the present invention is to enable normal operation of a circuit with very lower filtering capacitor and prevent abnormal operation due to lowered capacitance at the input end and poor voltage regulation characteristics by means of an LC network connected ahead rectifying network and filtering, isolating and energy-storage capacitors collocated.

A further object of the present invention is to prohibit the operation when the voltage and current become abnormal at the input end of the power network by means of a protective network connected between the rectifying network and the oscillator output circuit.

SUMMARY OF THE INVENTION

In order to achieve the above-mentioned objects a power supply unit according to a first embodiment of the invention comprises the following means:

A rectifier comprising four rectifying diodes; an oscillator output portion connected between two dc output terminals of said rectifier, in which a positive pole of a power supply of said oscillator output portion is connected to a positive output terminal of said rectifier and a negative pole of the power supply of said oscillator output portion is connected to a negative output terminal of said rectifier, and in which output of said oscillator output portion being connected through an first inductor to a first pole of a filament at a first end of a fluorescent lamp; a first capacitor parallel-connected between a second pole of at the first end and a second pole of a second end poles at a second an the first ends of the fluorescent lamp; a second inductor series-connected to one of two input terminals of the rectifier, its value being greater than 0.2 mH; a second capacitor parallel-connected between the two input terminals of the rectifier and located before or after said inductor, its value being 0.1–0.3 $\mu$f; a capacitor parallel-connected between the output terminals of said rectifier, its value being less than 0.68 $\mu$f; and a third capacitor of a value greater than 0.68 $\mu$f, one of its ends being connected to the negative pole of the power supply of the oscillator output portion and the other end to a first pole of the filament at the second end of the fluorescent lamp.

A power supply unit according to a second embodiment of the present invention it comprises the following means:

a rectifier (3) comprising first, second, third and fourth rectifying diodes (31, 32, 33, 34); an oscillator output portion (5) connected between positive and negative dc output terminals (P3 and P4) of said rectifier (3), said oscillator output portion (5) having a positive power supply terminal (52) connected to the positive output terminal (P3) of said rectifier (3), a negative power supply terminal (53) connected to the negative dc output terminal (P4) of said rectifier (3), and an output terminal (51) connected via a first inductor (6) to a first pole of a filament at a first end of a fluorescent lamp (FL).

The power supply unit further includes a first capacitor (8) parallel-connected between a second pole of the filament at the first end of said fluorescent lamp and a second pole of the filament at a second end of said fluorescent lamp, a second inductor (1) series-connected to one of positive and negative ac input terminals (P1 and P2) of said rectifier (3), a second capacitor (2) parallel-connected between said positive and negative input terminals (P1, P2) of said rectifier (3), a third capacitor (4) parallel-connected between the positive and negative output terminals (P3 and P4) of said rectifiers (3), and a fourth capacitor (7) having one of its ends connected to the negative power supply terminal (53) of said oscillator output portion (5) and the other end connected to a first pole of the filament at the second end of said fluorescent lamp (FL).

Additionally, the power supply unit further comprises a sampling resistor (9) and a module (10).

Module 10 has positive and negative power supply terminals (101 and 105) connected to said positive and negative input terminals (P1 and P2) of said rectifier (3), respectively, a control output terminal (102) connected to a control input terminal (54) of said oscillator output portion (5), and a first and a second sampling input terminals (103, 104) connected respectively to the negative power supply terminal (53) of said oscillator output portion (5) and the negative dc output terminal (P4) of said rectifier (3).

The sampling resistor (9) is connected between said negative power supply terminal (53) of said oscillator output portion (5) and said negative dc output terminal (P4) of said rectifier (3).

Said module (10) comprises a rectifying unit (11) comprising fifth and sixth rectifying diodes (106, 107) and said third and fourth rectifying diodes (33, 34) of said rectifier (3), wherein the fifth and sixth rectifying diodes (106, 107) have their anodes connected respectively to said positive and negative input terminals (P1 and P2) of said rectifier (3), and their cathodes connected together to form a positive output terminal (P5) of said rectifying unit (11) while the anodes of the third and fourth diodes (33, 34) are connected to form the negative output terminal (P4) of said rectifying unit (11); a filtering capacitor (108) parallel-connected between the positive and negative output terminals (P5 and P4) of said rectifying unit (11).

The positive output terminal (P5) of said rectifying unit (11) is connected via a first resistor (109) to the anode of a Semiconductor Control Rectifier (SCR) (1011), and to the cathode of a seventh diode (1010), the anode of the seventh diode (1010) forming the output control terminal (102).

The module further comprises a SCR control network (1015, 1016, 1014, 1013 and 1012) comprising a second resistor (1015), a fifth capacitor (1016), an eighth diode (1014), a third resistor (1013), and a sixth capacitor 1012, the second resistor (1015) having one of its ends connected to an anode of the eighth diode (1014) and the other end to the negative output terminal (53) of said oscillator output portion (5), a cathode of the eighth diode (1014) connected to a controller of the SCR (1011), a capacitor (1016) connected between the connecting node of the resistor (1015) and the anode of the eighth diode (1014) and the cathode of the SCR (1011), the third resistor (1013) and the sixth capacitor (1012) being first parallel-connected to each other and then connected between the controller and cathode of the SCR, said cathode of the SCR connected to the negative output terminal (P4) of said rectifying unit.

BRIEF DESCRIPTION OF THE DRAWINGS

One way of carrying out the invention is described in detail below with reference to drawings, in which.

DETAILED DESCRIPTION

Figure 1:
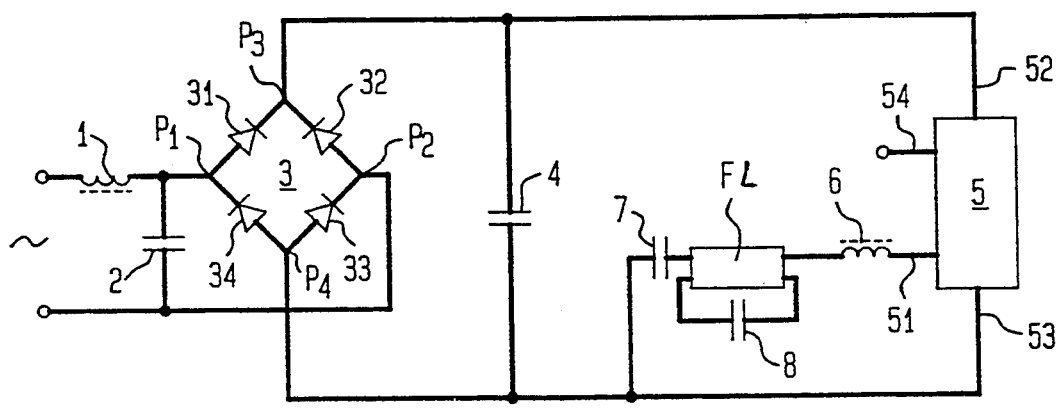
FIG. 1 is the block diagram of a power supply for fluorescent lamps in accordance of the present invention.

FIG. 1 is the block diagram of a power supply for fluorescent lamps in accordance with the present invention. In the diagram, component 1 is an inductive coil series-connected between the ac power supply and input terminal P1 or P2 of rectifier 3; component 2 is a capacitor located after or before component 1 and parallel-connected between the two ac input terminals P1 and P2 of rectifier 3. Bridge rectifier 3 consists of four diodes 31, 32, 33 and 34; capacitor 4 is parallel-connected between dc output terminals P3 and P4 of rectifier 3; a self-biasing, self-excitation oscillator circuit 5 has a positive dc power terminal 52 connected to the positive dc output terminal of rectifier 3, a negative dc power terminal 53 connected to the negative dc output terminal of rectifier 3, and a control input terminal 54 able to couple to the protective circuit of present invention. Oscillator circuit 5 also has an ac output terminal 51, which is first series-connected to inductor 6 and then to a pole of the filament at one end of the lamp FL (FL is a fluorescent lamp with two filament ends and four lead poles). A pole at the other filament end of lamp FL is connected, via capacitor 7a, to the negative power supply terminal 53 of oscillator circuit 5. Capacitor 8a is parallel-connected to the other corresponding poles of lamp FL. For the present invention, the value for inductor 1 is greater than 0.2 mH, its range being normally 0.2–50 mH. The value for capacitor 4 is less than 0.68 $\mu f$, its range being normally 0.001–0.68 $\mu f$. The value for capacitor 7 is greater than 0.68 $\mu f$, its range being normally 0.68–6 $\mu f$. The value for capacitor 2 is 0.1 $\mu f$, its range being normally 0.1–0.3 $\mu f$.

Figure 5A:
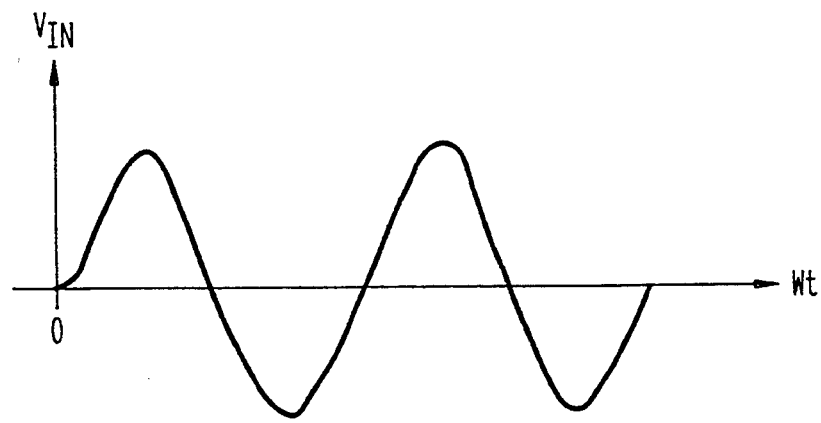
FIG. 5a is a representation of the conventional voltage wave form between terminals P1 and P2 of the circuit in FIG. 1.
Figure 5B:
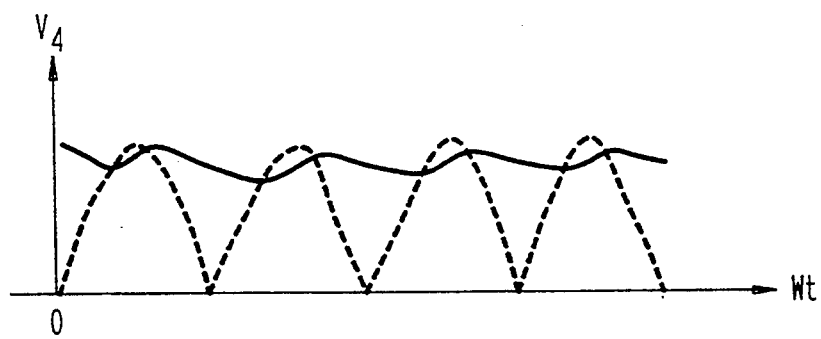
FIG. 5b is a representation of the conventional voltage wave form between terminals P3 and P4 of the circuit in FIG. 1.
Figure 5C:
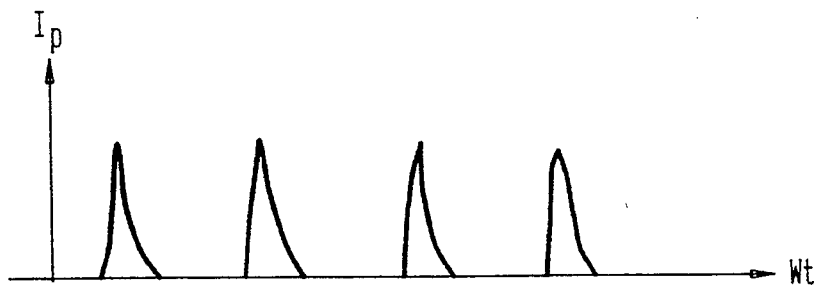
FIG. 5c is a representation of current wave form of the rectifying diodes in the conventional rectifying circuit.

In the prior design of this type of multi-unit circuit, the circuits of the individual units were designed separately first and then combined. As shown in FIG. 1, in the conventional circuit, rectifier 3 and capacitor 4 form the rectifying and filtering circuit unit, and the capacitance of capacitor 4 is made as large as possible. This is because when a sine wave voltage as shown in FIG. 5a is applied to the input of rectifier 3, the voltage across capacitor 4 as shown in FIG. 5b takes a saw tooth-wave form while the current in the rectifying diodes has the form of a peaked pulse as shown in FIG. 5c. Since this circuit unit is intended to supply power to the following stage oscillator output portion, the output voltage should be as smooth as possible, in other words, the capacitance of capacitor 4 should be as large as possible. But, as the capacitance of capacitor 4 increases, the conductive duration of the diodes decreases, i.e., the peaked pulse width reduces. As a result, the larger the pulse current is for charging the capacitor, the larger the component of harmonics will be. If this current is not suppressed, it will burst into the ac power network, causing a shock to the ac power network. To suppress such a current, it is necessary to increase the number of or change the filtering circuit. This would inevitably complicate the circuit and also reduce the power factor.

Figure 6:
FIG. 6 is a representation of the current wave form on the diodes of the rectifier of the present invention.
Figure 7:
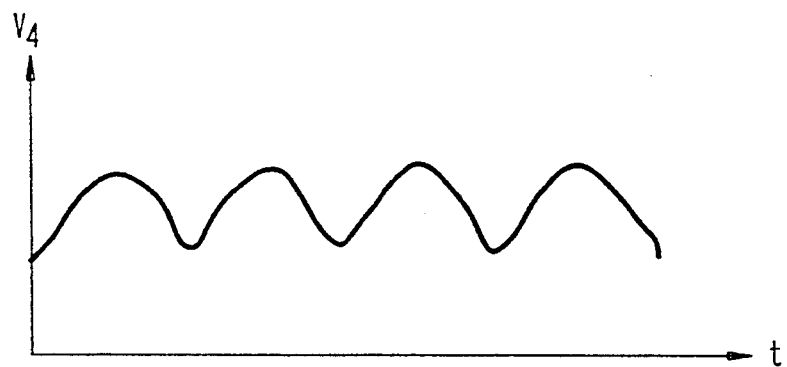
FIG. 7 is a representation of the wave form at the output terminal of the rectifier in the power supply of fluorescent lamps in accordance with the present invention.
Figure 8:
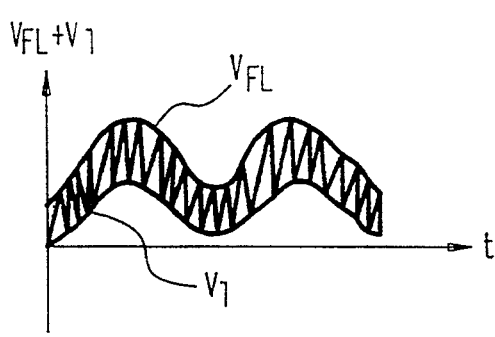
FIG. 8 is a representation of the wave forms of the voltage VFL across the fluorescent lamp and the voltage V7 across capacitor 7 when the power supply of fluorescent lamps of this invention is used.
Figure 9:
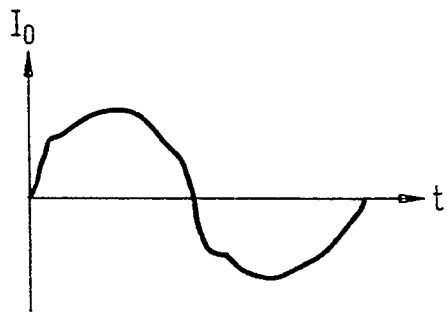
FIG. 9 is a representation of the current wave form at the input terminal of the power supply of fluorescent lamps in accordance with present invention.

However, the present invention has eliminated such a drawback. In the circuit shown in FIG. 1, capacitor 4 is given a very small capacitance; in the same condition as mentioned above, the current in the diodes of rectifier 3 has a wave form as shown in FIG. 6, the conductive time of rectifying diode in the circuit become longer, thus increasing the power factor greatly. This design also involves the problem of zero passing, that is, at the start or end of each half cycle of the input voltage, the input voltage is approximately zero and at this moment the circuit of the oscillator output portion at the back stops oscillating; in other words, the oscillating circuit oscillates in blocks, making the fluorescent lamp glitter. One way to solve this problem is to connect an LC circuit comprising inductor 1 and capacitor 2 to the input terminal of rectifier 3. According to an aspect of present invention, owing to mutual actions of inductor 1, capacitor 2, capacitor 4 and capacitor 7, the voltage after rectification is always higher than a certain value (the value is dependent on the values of inductor 1 and capacitor 2). With such a modification, the voltage wave form on capacitor 4 is as shown in FIG. 7, its output voltage is greater than zero but fluctuates. When such a voltage is applied to circuit of the oscillator output portion 5 and series-connected capacitor 7, inductor 6 and fluorescent lamp (load FL) are taken as the load, output voltage as shown in FIG. 8 will be generated, V7 being the voltage on capacitor 7 and VFL the voltage on the lamp. The wave form of the corresponding input current will be like the one shown in FIG. 9. The input current wave form is evidently an approximation of a sine wave in which the components of higher harmonics have reduced greatly; however, the envelop of the output voltage of the oscillator output portion is always above the zero line (i.e., positive). Thus, the action of rectifier 3 prevents this high frequency current from bursting into the power network to do harm to it. Therefore, it is very obvious that inductor 1 and capacitor 7 have a multitude of functions. Inductor 1 serves as an energy-storing component and also one for phase shifting, power factor compensation and power supply filtering; whereas capacitor 7 is used for energy storing, phase shifting and isolating. The multifunction of these two components has increased the power factor.

According to another aspect of the present invention as shown in FIG. 8, since the output voltage of the rectifying and filtering circuit varies within a certain range, the circuit of the oscillator output portion 5 should also be adjusted correspondingly.

Figure 4:
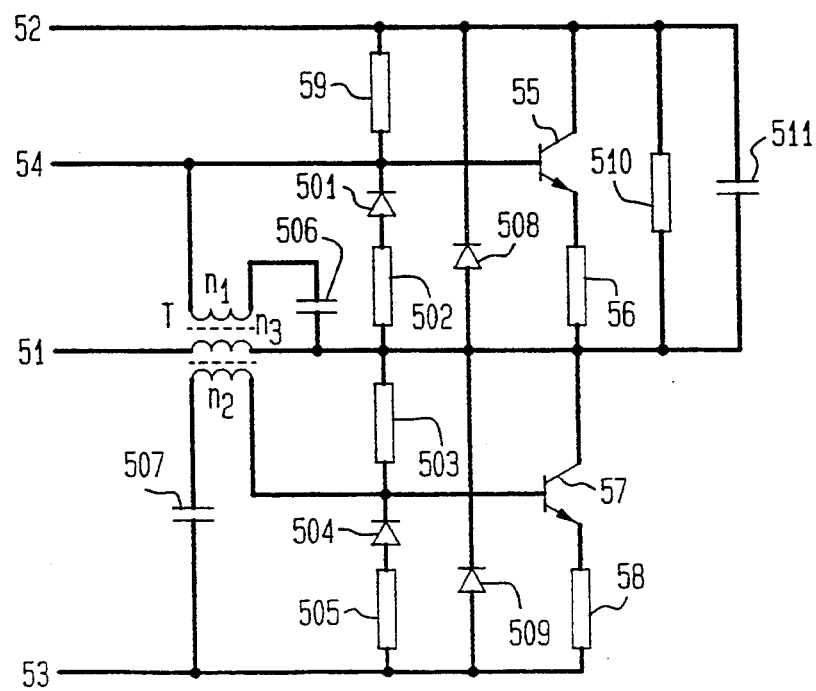
FIG. 4 is a diagram of the oscillator circuit, which is part of the power supply for fluorescent lamps in accordance with the present invention.

As shown in FIG. 1, this part of the circuit in the oscillator output portion 5 is a type of self-biasing, self-excitation oscillator circuit designed in a conventional way taking into account the features of the circuits in accordance with the present invention. Its circuit diagram is shown in FIG. 4.

The feature of said self-biasing, self-excitation circuit is that its oscillating frequency is independent of the magnitude of the voltage provided by the rectifying and filtering circuit. When the rectification output voltage is applied to the oscillator circuit and varies within a certain range, the output oscillating frequency remains unchanged. It should be pointed out that in the design of prior art, capacitors 506 and 507 are given rather big values while in the circuit of the present invention, capacitors 506, 507 are given a value of 0.68–1.5 $\mu f$; thus, when the circuit has a low voltage regulation factor, i.e., when a fluctuating voltage as shown in FIG. 8 is applied to the power supply terminals, the circuit can still operate normally.

Figure 2:
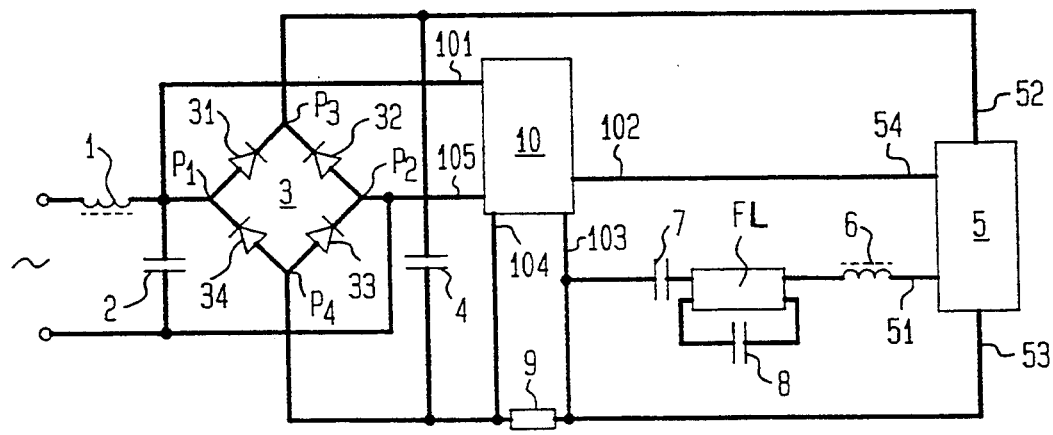
FIG. 2 is the block diagram of another power supply for fluorescent lamps and its protective circuit in accordance with the present invention.

According to a further aspect of the present invention, an overcurrent, overvoltage protective circuit is proposed. As shown in FIG. 2, the protective circuit includes a sampling resistor 9 and module 10. The two power terminals 101 and 105 of the said module 10 are connected respectively to the input terminals P1 and P2 of rectifier 3, and its control output terminal 102 is connected to the control input terminal 54 of the oscillator output portion 5. The sampling input terminals 103 and 104 are connected respectively to the negative power terminal 53 of the oscillator output portion 5 and the negative output terminal of rectifier 3. The said sampling resistor 9 is connected across the negative power terminal 53 of oscillator output portion 5 and output terminal P4 of rectifier 3.

Figure 3:
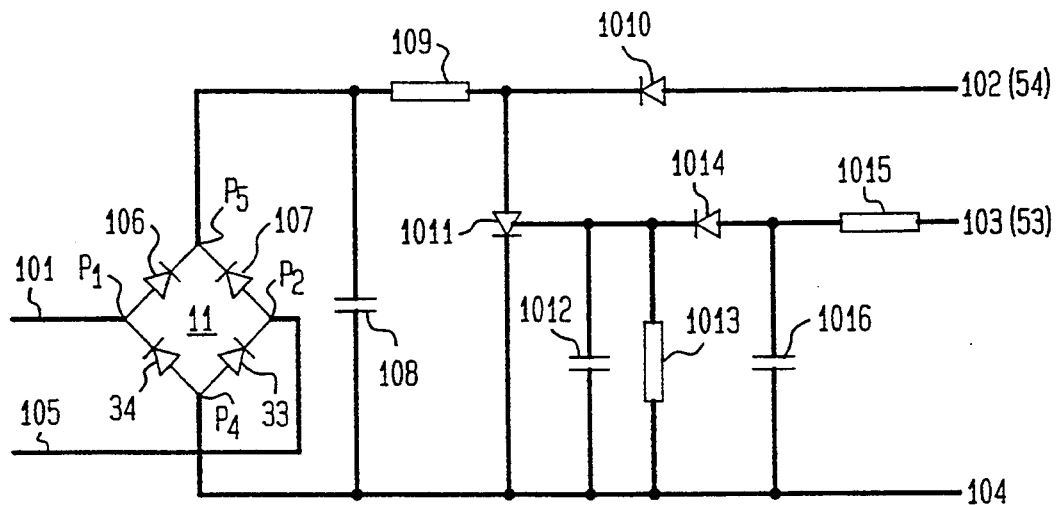
FIG. 3 is a detailed circuit diagram of the protective circuit shown in FIG. 2.

As described above, module 10 has 5 terminals altogether, including two ac input terminals 101 and 105, two sampling terminals 103 and 104 and one control output terminal 102. This module 10 and sampling resistor 9 in FIG. 2 form the overvoltage, overcurrent protective circuit of the present invention, and FIG. 2 shows how the protective circuit is connected with the other parts in the circuit. In FIG. 2, module 10 is the protective circuit of the present invention. Its ac input terminals 101 and 105 are connected respectively to the two ac input terminals P1 and P2 of the present power supply unit; sampling input terminal 104 is connected to where sampling resistor 9 and rectifier 3 are connected; sampling input terminal 103 is connected to a node in which sampling resistor 9 and the negative power supply terminal 53 of oscillator output portion 5 being connected; control output terminal 102 is connected to control input terminal 54 of oscillator output portion 5. The connection of the remaining parts is the same as shown in FIG. 1. The working principle of the protective circuit is as shown in FIG. 3. In FIG. 3, rectifier 11 is different from rectifier 3 in FIG. 1, and is composed of the two diodes 34, 33 of rectifier 3 and another two diodes 106 and 107. The anodes of diodes 106 and 107 are connected respectively to the cathod of diodes 33 and 34; the cathod of diodes 106 and 107, after being connected, become the positive dc output terminal P5 of the rectifier. The negative dc output terminal of rectifier 11 and the negative dc output terminal P4 of rectifier 3 are a common terminal. Capacitor 108 is parallel connected across the two dc output terminals P4 and P5 of rectifier 11. Resistor 109 has one of its ends connected to positive output terminal P5 of rectifier 11 and the other end to the cathod of diode 1010, whereas the anode of diode 1010 serves as output control terminal 102 of module 10. Silicon Controlled Rectifier (SCR) 1011 has its anode connected to where resistor 109 and diode 1010 are connected, and its cathod to negative dc output terminal P4 of rectifier 11, and its controller to the SCR control network comprising resistors 1013, 1015, diode 1014, capacitors 1012 and 1016, wherein the parallel-connected capacitor 1012 and resistor 1013 have one of their ends connected to the controller of SCR 1011, and the other end to the cathod of the SCR 1011. The cathod of diode 1014 is connected to the controller of SCR 1011 and the anode is connected to resistor 1015. The other terminal of resistor 1015 and the cathod of SCR 1011 form the two sampling input terminals 103 and 104 of the present module 10. Capacitor 1016 has one of its end connected to the node where diode 1014 and resistor 1015 are connected, and the other end to the cathod of SCR 1011. The two ac input terminals 101 and 105 of module 10 are respectively tapped from the connection node of diodes 34 and 106 and that of diodes 33 and 107.

When the current is excessively large in oscillator output portion 5, the voltage drop on sampling resistor 9 increases and as a result, diode 1014 becomes conductive and charges capacitor 1012. At this moment, a positive pulse is generated at the controller of SCR 1011, making SCR 1011 conductive. After SCR 1011 becomes conductive, the potential at the anode drops rapidly, and, through diode 1010, causes the potential at the circuit input terminal of the following stage oscillator output portion 5 to drop, and forces the circuit of the oscillator output portion 5 to stop oscillating.

The adoption of such a circuitry has improved the quality of this kind of power supply unit from the very foundation, giving the input current a near sine wave form making the third-order harmonics less than 7% and the power factor greater than 0.95. Furthermore, as the capacitance of capacitor 4 can be given a very small value and capacitors 2 and 7 do not have large values, no electrolytic capacitors are needed in the entire power supply unit. The overvoltage, overcurrent protective circuit has increased the reliability of the circuit. The present invention starts safely and operates reliably at ambient temperature of −20 to +45 deg C in a conventional power network.

Figure 10:
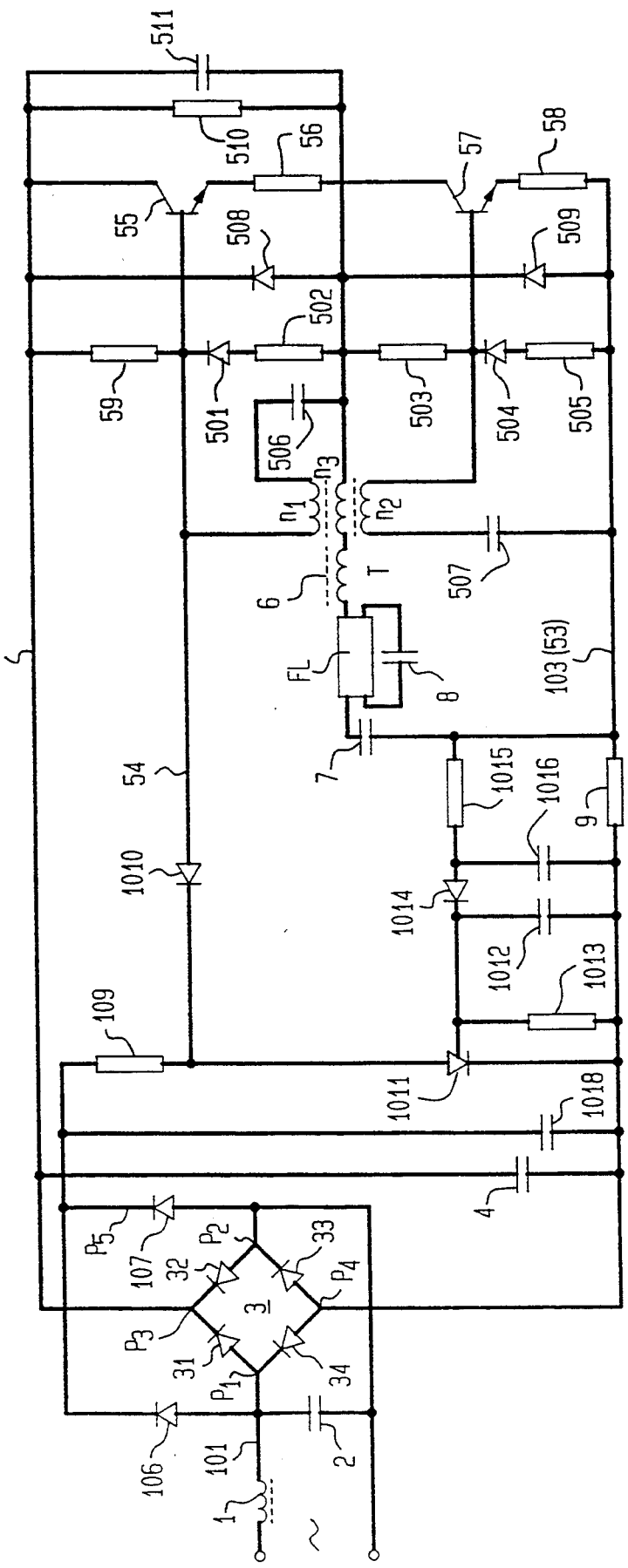
FIG. 10 is the circuit diagram of an preferred embodiment of the present invention.

The circuit shown in FIG. 10 is an preferred embodiment of the present invention, in which one end of inductor 1 is directly connected to the power network such as 110 V/220 V, 50 Hz/60 Hz ac power supply, capacitor 2 is located after inductor 1 and connected across the input terminals and capacitor 4 is parallel-connected between the output terminals of rectifier 3.

Oscillator output portion 5 employs a self-biasing, self-excitation oscillator circuit comprising switching transistors 55, 57. Inductor 6 has one end connected to one pole of one filament of fluorescent lamp FL and the other end first series-connected to winding N3 of transformer T in the oscillator output portion 5 and then to the node where the series-connected resistor 56 at the emitter of transistor 55 and the collector of transistor 57 are connected. Winding N1 of transformer T has one of its ends series-connected first to capacitor 506, then connected to where series-connected resistor 56 at the emitter of transistor 55 and the collector of transistor 57 are connected, and the other end to the base of transistor 55. Winding N2 of the transformer has one of its ends first series connected to capacitor 507 and then to the series-connected resistor 58 at the emitter of transistor 57, and the other end to the base of transistor 57. Resistors 59, 503 are parallel connected respectively between the collectors and bases of transistors 55 and 57. After the anode of diode 501 is series-connected to resistor 502 and the anode of diode 504 is series connected to resistor 505, they are parallel-connected respectively between the series-connected resistors 56, 58 at the emitters of transistors 55, 57 and their bases. Resistor 510 and capacitor 511 are first parallel connected, and then parallel-connected between the collector of transistor 55 and the series-connected resistor 56 at its emitter. Diodes 508, 509 are parallel-connected respectively between the collectors of transistors 55, 57 and resistors 56, 58 at their emitters.

Diodes 106, 107 have their anodes connected respectively to the two ac input terminals P1, P2 of rectifier 3, and their cathod first connected to each other (P5), and then, via resistor 109, connected to the cathod of diode 1010 and the anode of SCR 1011. The anode of diode 1010 is connected to the base of the transistor 55 in circuit of the oscillator output portion 5. The cathod of SCR 1011 is connected to the negative output terminal P4 of rectifier 3. After resistor 1013 and capacitor 1012 are parallel connected, they have one of their ends connected to the controller of SCR 1011, and the other end to the negative output terminal P4 rectifier 3. Diode 1014 has its cathod connected to the controller of SCR 1011 and its anode to one end of capacitor 1016 and resistor 1015. The other end of capacitor 1016 is connected cathod of SCR 1011. The other end of resistor 1015 is connected to the negative power supply terminal 53 of the oscillator output portion 5. Resistor 9 is connected across the negative output terminal P4 of the rectifier 3 and the negative power supply terminal 53 of the oscillator output portion 5.

Capacitor 7 has one of its ends connected to one pole of the filament of fluorescent lamp FL and the other end to ground. Capacitor 8 is parallel-connected between the other pair of poles of the filaments at the two lamp ends.

For a fluorescent lamp of 40 watt, the components of the power supply unit in an embodiment of the present invention are given as follows:

| | |
|---|---|
| Transitor | 55, 57-MJE13005 |
| Diode | 31, 32, 33, 34, 106, 107, 501, 504, 508, 509-IN 4004 |
| Capacitor | 2-0.1 μf/400V |
| | 4, 8-1000Pf/400V |
| | 7-4 μf/250V |
| | 506-0.68 μf/250V |
| | 507-0.68 μf/63V |
| | 1012-0.01μ |
| | 1016-220μ |
| resistor | 59, 503, 510-470KΩ/¼W |
| | 502, 505-50Ω/¼W |
| | 56, 58-620Ω/2W |
| | 109-270KΩ |
| | 1013-2.7KΩ |
| | 1015-27KΩ |
| | 9-5.5Ω |
| diode | 1014-2CK |
| | 1010-PN4007 |
| SCR | 1011-MCR100-6 |
| Inductor | 1-5 mH |
| | 6-1.10 mH |
| transformer | N1:N2:N3 = 8:8:3 |
| | μ = 4000 |

What is claimed is:

1. A power supply unit for discharging lamps comprising:
   a rectifier (3) comprising four rectifying diodes (31, 32, 33, 34);
   an oscillator output portion (5) connected between positive and negative dc output terminals (P3 and P4) of said rectifier (3),
   said output portion (5) having a positive power supply terminal (52) connected to the positive dc output terminal (P3) of said rectifier (3), a negative power supply terminal (53) connected to the negative dc output terminal (P4) of said rectifier (3), and an output terminal (51) connected via a first inductor (6) to a first pole of a filament at a first end of a fluorescent lamp (FL);

a first capacitor (8) parallel-connected between a second pole of the filament at the first end of said fluorescent lamp (FL) and a second pole of the filament at a second end of said fluorescent lamp;

a second inductor (1) of a value greater than 0.2 mH series-connected to one of two ac input terminals (P1, P2) of said rectifier (3);

a second capacitor (2) of a value ranging between 0.1 and 0.3 μf parallel-connected between said two ac input terminals (P1, P2) of said rectifier (3);

a third capacitor (4) of a value less than 0.68 μf parallel-connected between said positive and negative dc output terminals (P3 and P4) of said rectifier (3); and a fourth capacitor (7) of a value greater than 0.68 μf, having one of its ends connected to said negative power supply terminal (53) of said oscillator output portion (5), the other end connected to a first pole of the filament at the second end of said fluorescent lamp (FL).

2. A power supply unit for discharging lamps comprising:

a rectifier (3) comprising first, second, third and fourth rectifying diodes (31, 32, 33, 34);

an oscillator output portion (5) connected between positive and negative dc output terminals (P3 and P4) of said rectifier (3), said oscillator output portion (5) having a positive power supply terminal connected to the positive output terminal (P3) of said rectifier (3), a negative power supply terminal (53) connected to the negative dc output terminal (P4) of said rectifier (3), and an output terminal (51) connected via a first inductor (6) to a first pole of a filament at a first end of a fluorescent lamp (FL);

a first capacitor (8) parallel-connected between a second pole of the filament at the first end of said fluorescent lamp and a second pole of the filament at a second end of said fluorescent lamp;

a second inductor (1) series-connected to one of positive and negative ac input terminals (P1 and P2) of said rectifier (3);

a second capacitor (2) parallel-connected between said positive and negative input terminals (P1, P2) of said rectifier (3);

a third capacitor (4) parallel-connected between the positive and negative output terminals (P3 and P4) of said rectifier (3);

a fourth capacitor (7) having one of its ends connected to the negative power supply terminal (53) of said oscillator output portion (5) and the other end connected to a first pole of the filament at the second end of said fluorescent lamp (FL); and a sampling resistor (9) and a module (10), said module 10 having positive and negative power supply terminals (101 and 105) connected to said positive and negative input terminals (P1 and P2) of said rectifier (3), respectively, a control output terminal (102) connected to a control input terminal (54) of said oscillator output portion (5), and a first and a second sampling input terminals (103, 104) connected respectively to the negative power supply terminal (53) of said oscillator output portion (5) and the negative dc output terminal (P4) of said rectifier (3), said sampling resistor (9) being connected between said negative power supply terminal (53) of said oscillator output portion (5) and said negative dc output terminal (94) of said rectifier (3).

3. A power supply unit for discharging lamps comprising:

a rectifier (3) comprising first, second, third and fourth rectifying diodes (31, 32, 33, 34);

an oscillator output portion (5) connected between positive and negative dc output terminals (P3 and P4) of said rectifier (3), said oscillator output portion (5) having a positive power supply terminal (52) connected to the positive output terminal (P3) of said rectifier (3), a negative power supply terminal (53) connected to the negative dc output terminal (P4) of said rectifier (3), and an output terminal (51) connected via a first inductor (6) to a first pole of a filament at a first end of a fluorescent lamp (FL);

a first capacitor (8) parallel-connected between a second pole of the filament at the first end of said fluorescent lamp and a second pole of the filament at a second end of said fluorescent lamp;

a second inductor (1) series-connected to one of positive and negative ac input terminals (P1 and P2) of said rectifier (3);

a second capacitor (2) parallel-connected between said positive and negative input terminals (P1, P2) of said rectifier (3);

a third capacitor (4) parallel-connected between the positive and negative output terminals (P3 and P4) of said rectifiers (3);

a fourth capacitor (7) having one of its ends connected to the negative power supply terminal (53) of said oscillator output portion (5) and the other end connected to a first pole of the filament at the second end of said fluorescent lamp (FL); and a sampling resistor (9) and a module (10), said module 10 having positive and negative power supply terminals (101 and 105) connected to said positive and negative input terminals (P1 and P2) of said rectifier (3), respectively, a control output terminal (102) connected to a control input terminal (54) of said oscillator output portion (5), and a first and a second sampling input terminals (103, 104) connected respectively to the negative power supply terminal (53) of said oscillator output portion (5) and the negative dc output terminal (P4) of said rectifier (3), said sampling resistor (9) being connected between said negative power supply terminal (53) of said oscillator output portion (5) and said negative dc output terminal (P4) of said rectifier (3), said module (10) comprising:

a rectifying unit (11) comprising fifth and sixth rectifying diodes (106, 107) and said third and fourth rectifying diodes (33, 34) of said rectifier (3), wherein the fifth and sixth rectifying diodes (106, 107) have their anodes connected respectively to said positive and negative input terminals (P1 and P2) of said rectifier (3), and their cathodes connected together to form a positive output terminal (P5) of said rectifying unit (11) while the anodes of the third and fourth diodes (33, 34) are connected to form the negative output terminal (P4) of said rectifying unit (11);

a filtering capacitor (108) parallel-connected between the positive and negative output terminals (P5 and P4) of said rectifying unit (11), the positive output terminal (P5) of said rectifying unit (11) being connected via a first resistor (109) to the anode of a Semiconductor Control Rectifier (SCR) (1011), and to the cathode of a seventh diode (1010), the anode of the seventh diode (1010) forming the output control terminal (102);

a Silicon Controlled Rectifier (SCR) control network (1015, 1016, 1014, 1013 and 1012) comprising a second resistor (1015), a fifth capacitor (1016), an eighth diode (1014), a third resistor (1013), and a sixth capacitor (1012), the second resistor (1015) having one of its ends connected to an anode of the eighth diode (1014) and the other end to the negative output terminal (53) of said oscillator output portion (5), a cathode of the eighth diode (1014) connected to a controller of the SCR (1011), a capacitor (1016) connected between the connecting node of the resistor (1015) and the anode of the eighth diode (1014) and the cathode of the SCR (1011), the third resistor (1013) and the sixth capacitor (1012) being first parallel-connected to each other and then connected between the controller and cathode of the SCR, said cathode of the SCR connected to the negative output terminal (P4) of said rectifying unit.

* * * * *

UNITED STATES PATENT AND TRADEMARK OFFICE
CERTIFICATE OF CORRECTION

PATENT NO.   : 5,311,102
DATED        : May 10, 1994
INVENTOR(S)  : Rong Jiu Du

It is certified that error appears in the above-indentified patent and that said Letters Patent is hereby corrected as shown below:

On the title page, item [73]

The correct Assignee should be "Wei Hai Bei Yang Electric Group Corp., Wei Hai City, China"

Signed and Sealed this

Seventh Day of February, 1995

Attest:

BRUCE LEHMAN

*Attesting Officer*          *Commissioner of Patents and Trademarks*